Feb. 4, 1964     E. M. WELLS ETAL     3,120,659
MOVING TARGET RADAR SYSTEM
Filed Oct. 23, 1961
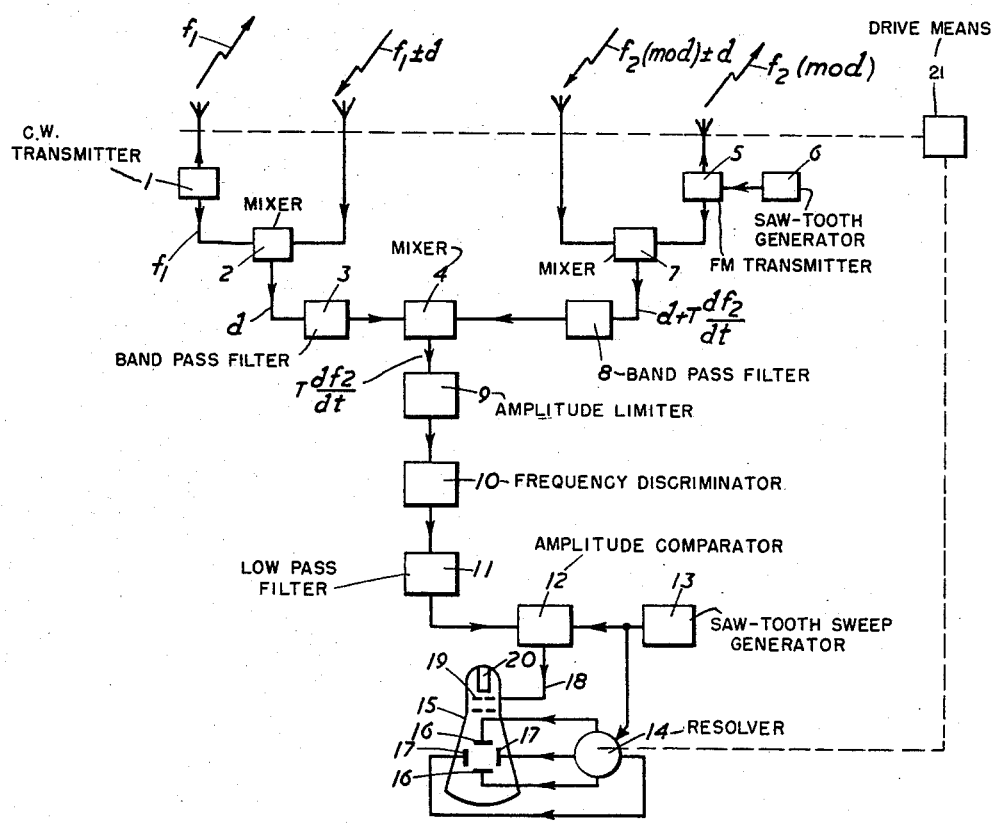
INVENTORS
Edward Marshall Wells
and
John Hosking Blythe
BY Baldwin & Wight
ATTORNEYS

United States Patent Office 3,120,659
Patented Feb. 4, 1964

3,120,659
MOVING TARGET RADAR SYSTEM
Edward Marshall Wells, Great Baddow, Essex, and John Hosking Blythe, Chelmsford, Essex, England, assignors to The Marconi Company Limited, a British company
Filed Oct. 23, 1961, Ser. No. 146,761
Claims priority, application Great Britain Jan. 10, 1961
6 Claims. (Cl. 343—7.7)

This invention relates to radar systems and has for its object to provide improved and relatively simple radar systems for detecting moving targets such as aircraft.

It is a common requirement that a radar system shall display only targets having a minimum predetermined radial velocity component, eliminating display of unwanted fixed or relatively slowly moving targets—generally called "clutter"—such as trees, houses or rain clouds. There are numerous known radar systems designed to satisfy this requirement. Thus, for example, there are the well known pulsed radar systems of the so-called M.T.I. (moving target indicator) type. When, however, known systems of this type are required for operation in the microwave region, e.g. with transmitted frequencies of 10,000 mc./s. or more, they exhibit the defects of "blind speeds" (i.e. inability to display targets of particular values of radial velocity component), and ambiguity of range measurement, and very considerable and expensive increases in complexity of equipment become necessary to eliminate these defects. Certain frequency modulated continuous wave radar systems, i.e. systems in which a frequency modulated continuous wave (F.M.C.W.) is transmitted instead of a pulsed wave, have also been proposed for giving moving target displays without clutter, but such systems as so far proposed are also complex and expensive and/or present the defect that they will not discriminate reliably between two targets moving at different speeds at different ranges if the difference between the Doppler frequencies of the targets in question is equal or nearly to the change in transmitted frequency occurring in the propagation time equivalent to twice the range difference of the targets.

The present invention, which, as will be seen later, provides improved radar systems of the F.M.C.W. type, seeks to avoid the foregoing difficulties and defects and to provide improved and relatively simple radar systems which will detect moving targets, ascertain their ranges without ambiguity, discriminate satisfactorily between them, and not "miss" moving targets having particular radial components of speed.

According to this invention a F.M.C.W. radar system comprises means for transmitting energy of one frequency; means for producing from said energy after reflection back from a moving target, a first produced frequency determined by the Doppler frequency of said target; means for transmitting energy of another frequency modulated in frequency in accordance with a predetermined law; means for producing from the last mentioned energy after reflection back from a moving target, a second produced frequency jointly determined by the Doppler frequency of said target and the change in the transmitted modulated frequency which has occured in the popagation time to said taget and back; means for combining the two produced frequencies to derive a frequency dependent on the said change; and means dependent on the value of the derived frequency for determining the range of said target.

According to a feature of this invention a F.M.C.W. radar system comprises a first frequency source; means for transmitting energy from said source and receiving it after reflection from a moving target; means for combining received reflected energy with energy from said source to produce a frequency equal to the Doppler frequency of said target; a second frequency source; means for continuously modulating energy from said second source in frequency in accordance with a predetermined law of frequency variation; means for transmitting the frequency modulated energy and receiving it after reflection from a moving target; means for combining the received modulated energy with the modulated energy from said source to produce a frequency composed of the Doppler frequency of the target and the change in the transmitted modulated frequency which has occurred in the propagation time to said target and back; means for combining the two produced frequencies to derive a frequency representative of said change; and means for measuring the derived frequency to determine the range of the target.

Preferably the two produced frequencies are fed to the combining means therefor through paths each of which includes a band-pass filter adapted to eliminate signals due to targets of less than a predetermined radial component of velocity.

Preferably also the frequency modulation is in accordance with a substantially linear saw-tooth law of variation. In this case a convenient means for determining range includes a limiter to which the derived frequency is fed, a frequency discriminator fed with output from said limiter, and display means responsive to the output from the discriminator.

In normal practice the various energies will, of course, be transmitted and received sharply directionally by means of a directional aerial installation which is swung in azimuth—usually continuously rotated—and a target display of the P.P.I. (plan position indicator) type will be required. In such a case a convenient arrangement comprises a saw tooth generator; a sine-cosine resolver fed with output from said generator and providing sine and cosine outputs; means for driving said resolver in synchronism with azimuth variation of the aerial installation; a cathode ray display tube having mutually perpendicular ray deflection means fed respectively with the sine and cosine outputs of the resolver; and amplitude comparator fed at one of its inputs with output from the saw-tooth generator and at the other of its inputs with a signal of amplitude proportional to the value of the derived frequency, said comparator being adapted to produce a pulse when the two inputs thereto are equal; and means for applying the produced pulses as "brighten-up" pulses to the cathode ray tube.

The invention is illustrated in the accompanying drawing which is a much simplified schematic diagram of one embodiment. For the sake of simplicity of drawing and description, the aerial installation is shown in the drawing as though it consisted of four fixed open aerials, two for transmitting and two for receiving. In normal practice, of course, the aerial installation would be of any convenient known design capable of transmitting and receiving the required frequencies directionally and would be swung or rotated in azimuth for azimuth scanning by any well known means (not shown) as ordinarily employed for azimuth scanning in known radar systems.

Referring to the drawing, 1 represents a continuous wave transmitter transmitting an unmodulated frequency $f_1$ as represented by the arrow so marked. A moving target will reflect this transmission producing a received frequency $f_1 \pm d$, where $d$ is the Doppler frequency due to the motion of the reflecting target. The transmitted frequency $f_1$ and the corresponding Doppler shifted received frequency are fed to a mixer 2, the output of which will consist of the Doppler frequency. This frequency is fed as one input to a second mixer 4 through a band pass filter 3 having a band pass such as to reject all signals due to undesired ground clutter and slow moving targets.

A second transmitter 5 producing a frequency $f_2$ is modulated in frequency in accordance with the output from a linear saw-tooth wave generator 6 so as to produce a frequency modulated output which is transmitted as represented by the arrow marked $f_2$ (mod.). A moving target reflecting this transmission will give rise to received signals of the modulated transmitted frequency shifted by the target Doppler frequency and as indicated by the arrow marked $f_2$ (mod.) $\pm d$. This received frequency and modulated frequency from the transmitter 5 are fed to the two inputs of a further mixer 7 whose output will accordingly consist of a frequency composed of the Doppler frequency and the change in transmission frequency produced by the frequency modulation in the propagation time taken for the radiated energy to reach the target and return. This is represented by the legend $$d + T\frac{df_2}{dt}$$

(T is the said propagation time) placed against the lead between the mixer 7 and a band pass filter 8 serving the same purpose as that of the filter 3 i.e. serving to eliminate undesired signals due to ground clutter and targets of less than a predetermined radial velocity component. The output from the filter 8 forms the second input to the mixer 4.

The output from the mixer 4 will accordingly be the frequency $$T\frac{df_2}{dt}$$

and its value will depend upon the range of the target. This output is fed to an amplitude limiter 9 which in turn feeds into a frequency discriminator 10 adapted to produce a D.C. output signal of value proportional to and representative of the frequency fed into the discriminator 10. The output from the discriminator 10 is fed as one input to an amplitude comparator 12 through a low pass filter 11 serving to smooth the signals and remove as much "noise" as possible. The second input to the comparator 12 is provided by a substantially linear saw-tooth waveform "sweep" generator 13, the output from which is also taken as input to a known sine-cosine resolver 14 which is driven in synchronisation with the rotation of the directivity of the aerial installation in azimuth by drive means 21 as conventionally illustrated by the dashed lines. The resolver gives sine and cosine outputs in the ordinary well known way and these are applied respectively to the mutually perpendicular deflecting means of a display cathode ray tube schematically represented at 15 having the usual fluorescent screen. In the drawing the mutually perpendicular deflecting means for the cathode ray are represented as mutually perpendicular pairs 16—17 of electrostatic deflector plates but obviously other known deflection means may be used if desired. The comparator 12 is constructed in accordance with known principles so as to produce an output pulse at the instant when the two inputs thereto are equal and this output pulse is applied as 'brighten up" pulse to the cathode ray tube—as shown the output pulse is represented as applied over the lead 18 to the control grid 19 of the tube, the cathode of which is indicated at 20. The tube 15 will accordingly display moving targets on its screen in the familiar P.P.I. fashion.

We claim:

1. A frequency modulated continuous wave radar system comprising means for transmitting energy of one frequency; means for producing from said energy, after reflection back from a moving target, a first produced frequency determined by the Doppler frequency of said target; means for transmitting energy of another frequency modulated in frequency in accordance with a predetermined law; means for producing from the last mentioned energy, after reflection back from a moving target, a second produced frequency jointly determined by the Doppler frequency of said target and the change in the transmitted modulated frequency which has occurred in the propagation time to said target and back; means for combining the two produced frequencies to derive a frequency dependent on the said changes; and means dependent on the value of the derived frequency for determining the range of said target.

2. A frequency modulated continuous wave radar system comprising a first frequency source; means for transmitting energy from said source and receiving it after reflection from a moving target; means for combining received reflected energy with energy from said source to produce a frequency equal to the Doppler frequency of said target; a second frequency source; means for continuously modulating energy from said second source in frequency in accordance with a predetermined law of frequency variation; means for transmitting the frequency modulated energy and receiving it after reflection from a moving target; means for combining the received modulated energy with the modulated energy from said source to produce a frequency composed of the Doppler frequency of the target and the change in the transmitted modulated frequency which has occurred in the propagation time to said target and back; means for combining the two produced frequencies to derive a frequency representative of said change; and means for measuring the derived frequency to determine the range of the target.

3. A radar system as claimed in claim 1 wherein the two produced frequencies are fed to the combining means therefor through paths each of which includes a band-pass filter adapted to eliminate signals due to targets of less than a predetermined radial component of velocity.

4. A radar system as claimed in claim 1 wherein the frequency modulation is in accordance with a substantially linear saw-tooth law of variation.

5. A radar system as claimed in claim 4 wherein range is determined by means including a limiter to which the derived frequency is fed, a frequency discriminator fed with output from said limiter, and display means responsive to the output from the discriminator.

6. A radar system in accordance with claim 1 and comprising a directional aerial installation; means for ranging said installation in azimuth; a saw tooth generator; a sine-cosine resolver fed with output from said generator and providing sine and cosine outputs; means for driving said resolver in synchronism with azimuth variation of the aerial installation; a cathode ray display tube having mutually perpendicular ray deflection means fed respectively with the sine and cosine outputs of the resolver; an amplitude comparator fed at one of its inputs with output from the saw-tooth generator and at the other of its inputs with a signal of amplitude proportional to the value of the derived frequency, said comparator being adapted to produce a pulse when the two inputs thereto are equal; and means for applying the produced pulses as "brighten-up" pulses to the cathode ray tube.

No references cited.